Patented Nov. 5, 1935

2,020,132

UNITED STATES PATENT OFFICE 2,020,132

METHOD OF BLEACHING MINERAL MATTER

Frederick W. Binns, Quincy, Mass., assignor to Virginia Smelting Company, Portland, Maine, a corporation of Maine No Drawing. Application January 19, 1932, Serial No. 587,607

17 Claims. (Cl. 252—8)

This invention relates to a method of bleaching mineral substances, such as fine sand, clay, bauxite, or the like.

In the various arts in which mineral substances are employed, it is a matter of common observation that, as originally obtained, such materials usually contain an appreciable amount of coloring matter. This may be present in two forms:— first as an ingredient of the mineral itself and hence contained within each (or a large proportion) of the particles of the material when reduced to comminuted condition; and secondly as a coating or deposit upon the exterior of each particle,—resulting from weathering of constituents of the surface of the particle, for example, or from deposition thereon by percolating ground waters or like agencies. The finely divided mineral may also contain extraneous coloring matter, independent of the mineral particles, but so finely divided or of such properties, in relation to the mineral particles, that separation is not mechanically practicable. Such coloring matter may be composed of finely divided coloring agents such as iron oxide or may be composed of organic residues.

It is an object of the present invention to treat such discolored mineral matters to reduce or eliminate the discoloration thereof by a simple and inexpensive and yet effective procedure. It is a further object so to convert the coloring matter that it may be rendered soluble and thereby removable from the charge. It is also an object to leave the mineral matter, after treatment, with substantially the same physical properties as before treatment,—(such, for example, as the tendency to settle slowly from aqueous suspension)—except for the removal or conversion of the objectionable coloring matter. Other objects will appear from the following disclosure.

The method of the present invention includes the treatment of comminuted mineral substances, typically containing coloring matter which is reducible to a substantially colorless or readily soluble condition, with a separately (and preferably freshly) prepared solution of hydrosulfite of zinc as hereinafter described. The mineral matter to be treated is first mixed with or suspended in water and if necessary acidified, preferably before the addition of the hydrosulfite solution. Hydrosulfite solution which has been freshly prepared in a relatively concentrated condition in a separate tank is then added. In this way, a relatively efficient reaction, to produce a concentrated solution of the hydrosulfite, is first assured and, upon addition of this solution to the sludge or suspension of mineral matter to be treated, a rapid and substantially complete bleaching of the mineral matter is accomplished.

A typical instance of the practical application of the invention will be described with reference to the treatment of clay. While clays, as they naturally occur in nature, vary widely in properties and in the industrial uses which they may serve accordingly, those which may serve the more exacting purposes, such as for high grade ceramic products and for paper coating, are relatively limited in quantity and hence in availability. English china clay and certain high grade clays from Georgia are indicative of this type of clays. These may be sufficiently white for use, per se, although it will be clear that even these products, if they become contaminated or run in veins which are discolored, may be unsatisfactory. There are other clays of high quality, however, as from certain beds in Vermont, Georgia and South Carolina, which contain iron oxide and are rendered slightly brownish thereby. These may be used for certain ceramic purposes, or other uses, but would be much more valuable if the color were removed.

Such clays are generally alkaline,—i. e., when mixed with fresh water, will impart thereto a pH value of 7.0 to 7.6 or perhaps higher,—or they may be substantially neutral. In this condition, the oxidized coloring matter which is present will not dissolve, nor will it be dissolved readily by acidification of the mineral matter or of the water surrounding it.

It is now found, however, that if the pH value of the aqueous suspension of the clay be somewhat lowered (by the addition of a mineral acid, for example, which neutralizes any alkaline materials which may be present and may also serve subsequently to dissolve the reduced coloring matter, but which may have substantially no effect upon the coloring matter in its original condition and the clay is treated with a solution of a bleaching agent consisting essentially of a soluble hydrosulfite of an alkaline metal, such as the alkali metals or alkaline earth metals, or zinc hydrosulfite, the oxidized coloring matter is both reduced and dissolved (by the mineral acid) and hence may be readily and substantially completely separated from the residual solid particles of clay. The reagent materials also remain in solution and are readily removed from the clay along with the dissolved coloring matter. The treated clay, as thus obtained, upon neutralizing retains its original desirable properties, such as fineness of subdivision, slow settling from suspension, plasticity, etc., and at the same time is substantially free from coloring matter.

For example, the clay may be mixed with water, in the usual way to produce a uniform fluid slip or slurry, and then treated with a sufficient quantity of sulfuric acid (or other suitable mineral acid or acid salt) to reduce the pH value to between 4 and 5, approximately, but preferably not above 5.5. To a ton of clay, as above described, 12 to 24 lbs. of sulfuric acid or equivalent, may be required. The mixture is then agitated to keep the suspension uniform.

To the suspension, as thus prepared, is then added a previously and separately prepared solution of zinc hydrosulfite, which reduces the iron (or like coloring matter contained in the clay) and simultaneously renders it soluble. For example, to an aqueous suspension of zinc, in approximately the proportion of 5 lbs. of zinc to 8 gallons of water, may be introduced approximately 8 lbs. of sulfur dioxide, preferably in liquid condition, with active agitation of the mixture but without foaming. The resulting freshly prepared solution of zinc hydrosulfite is preferably used at once, or within twenty-four hours, for the best results.

Such preparation of the hydrosulfite separately from the charge to be treated is found to be necessary, not only for the efficient conversion of the zinc and sulfur dioxide to zinc hydrosulfite but also for the effective bleaching action of the latter upon the clay to be treated. In dilute aqueous medium, for example, the equation $Zn+2SO_2 \rightleftharpoons ZnS_2O_4$ is retarded or may be reversed, by the presence of large amounts of water.

The preparation of the hydrosulfite solution may be conveniently carried out in the apparatus as described in U. S. Patent 1,472,828 dated November 6, 1923, to Frederic A. Eustis, and in accordance with the procedure described and claimed in my United States Patent 1,741,496, dated December 31, 1929.

The hydrosulfite solution is added to the acidified slip of clay,—preferably slowly and continuously and with constant agitation of the charge. If the charge is too strongly acidified or if the reagents are mingled so as to react too rapidly, the resulting reducing action upon the clay is diminished and free sulfur and other decomposition products may be liberated, which is undesirable. On the other hand, if too dilute or the charge is not sufficiently acidified (that is, if the pH value is appreciably above 5.5) the bleaching action will proceed too slowly for satisfactory commercial operation.

The treated charge may be allowed to settle, and at this stage the clay separates rapidly and completely. The supernatant reagent solution, containing excess of the original hydrosulfite, by-products of the reaction and dissolved coloring matter or converted compounds of the same, may then be decanted or otherwise readily removed from the treated and purified solid matter. More complete removal may be accomplished by repeated mixing with similar quantities of fresh water (and/or mineral acids), settling, and decanting, as before, and finally filtering and drying, if desired. Other modes of washing may be adopted, however, as by passing through a counter current continuous washer, or by filtering, or by similar treatments which are well known.

If a slow settling clay is desired, which is often advantageous for use in the paper trade, the bleached and washed slip or slurry may be neutralized just before filtering. This would be done by the addition to the slip just before it reaches the filter of a suitable amount of soda ash or caustic soda or other alkali. For the slowest settling the pH of the slip should be brought to a value between 7 and 8. By this procedure I get the advantage of rapid settling during the washing step, which often is slow, and still retain the advantage of a slow settling final product.

By such procedure, it has been accomplished to produce either a flat white or even a bluish white clay product. Such a product may, for some purposes, be too white. In such event a less amount of reagent or a shorter time of treatment may be employed. On the other hand, it may be desirable first to produce a high white product and then to modify the color by the addition of pigments, dyes, or the like, which will then not be altered by residual coloration of the clay.

The bleached or decolorized materials, such as clay, obtained as above described (and in accordance with the following claims) is rendered suitable not only for producing ceramic objects in which color is a most important desideratum, but for incorporation in paper fillers and paper coating compositions in which a high degree of whiteness and duplication of such degree of whiteness is essential. At the same time other desirable physical characteristics of the clay are not altered, such as fineness of subdivision, wettability by water, specific gravity and density (except possibly to be somewhat lighter) plasticity, friability when dry, softening range (except for removal of fluxing oxides) and in general the same or better suitability for the intended purpose—as the untreated clay.

Moreover, if the mineral matter contains organic coloring matter, other than wholly inert substances such as asphalt or elementary carbon, these coloring matters will likewise ordinarily be decreased or eliminated therefrom.

It should be understood that the present disclosure is for the purpose of illustration only and that this invention includes all modifications and equivalents which fall within the scope of the appended claims.

I claim:

1. Method of treating mineral substances, comprising the steps of preparing a solution of a hydrosulfite of an alkaline metal, separately preparing an acidified aqueous mixture of the mineral, adding the one to the other, and washing the treated mineral while maintaining the same in acid condition.

2. Method of treating mineral substances, comprising the steps of preparing a solution of a hydrosulfite of an alkaline metal, separately preparing an acidified aqueous mixture of the mineral, adding the one to the other, washing the treated mineral while maintaining the same in acid condition and thereafter neutralizing the treated charge.

3. Method of bleaching mineral substances containing coloring matter reducible to soluble form, comprising the steps of preparing a solution of a hydrosulfite of an alkaline metal and adding the freshly prepared solution to an aqueous mixture of the mineral to be bleached, the mixture having a controlled pH value not greater than 5.5.

4. Method of bleaching mineral substances containing coloring matter reducible to soluble form, comprising the step of treating the same, in the presence of a mineral acid solvent, with a solution of zinc hydrosulfite.

5. Method of bleaching mineral substances containing coloring matter reducible to soluble form, comprising the step of treating the same, in the presence of a mineral acid solvent, with a freshly prepared solution of zinc hydrosulfite.

6. Method of bleaching mineral substances containing coloring matter reducible to soluble form, comprising the step of treating the same, in aqueous suspension to impart a pH concentration thereto not exceeding 5.5, and then with a solution of zinc hydrosulfite.

7. Method of bleaching mineral substances containing coloring matter reducible to soluble form, comprising the step of treating the same, in aqueous suspension, to impart a pH concentration between 4 and 5.5 and then with a solution of zinc hydrosulfite.

8. Method of bleaching mineral substances containing coloring matter reducible to soluble form, comprising the step of treating the same, in aqueous suspension to impart a pH concentration thereto not exceeding 5.5, and then with a freshly prepared solution of zinc hydrosulfite, washing and neutralizing.

9. Method of bleaching mineral substances containing reducible coloring matter, comprising the step of treating the same, in aqueous suspension to impart a pH value not exceeding 5.5, and then with a freshly prepared solution of zinc hydrosulfite, washing while maintaining an acid medium, and controlling the slow-settling properties of the same by neutralizing to a pH between 7 and 8.

10. Method of bleaching mineral matters containing reducible coloring substances, comprising the step of treating the same, in aqueous suspension, with a solution of zinc hydrosulfite and removing the treating solution from the residual mineral matter by washing in acid solution.

11. Method of bleaching mineral matters containing reducible coloring substances, comprising the step of treating the same, in aqueous suspension, with a solution of zinc hydrosulfite and removing the treating solution from the residual mineral matter by washing in acid solution and thereafter adding an alkaline reagent to neutralize and impart a pH value thereto between 7.0 and 8.0 corresponding to the maximum slow-settling thereof from aqueous suspensions.

12. Method of bleaching mineral substances containing coloring matter reducible to soluble form, comprising the steps of treating zinc dust with sulfur dioxide in the presence of water, to form a concentrated solution of zinc hydrosulfite, and treating the mineral matter therewith in the presence of water.

13. Method of bleaching mineral substances containing coloring matter reducible to soluble form, comprising the steps of treating zinc dust with sulfur dioxide in the presence of water, to form a concentrated solution of zinc hydrosulfite, and treating the mineral matter therewith in the presence of water containing a mineral acid in such quantity as to reduce the pH value of the reaction mixture to not above 5.5.

14. Method of treating mineral substances, comprising the steps of preparing a solution of a hydrosulphite of an alkali metal, separately preparing an acidified aqueous mixture of the mineral, adding the one to the other, and washing the treated mineral while maintaining the same in acid condition.

15. Method of treating mineral substances, comprising the steps of preparing a solution of a hydrosulphite of an alkali metal, separately preparing an acidified aqueous mixture of the mineral, adding the one to the other, washing the treated mineral while maintaining the same in acid condition and thereafter neutralizing the treated charge.

16. Method of bleaching mineral substances containing coloring matter reducible to soluble form, comprising the steps of preparing a solution of a hydrosulphite of an alkali metal and adding the freshly prepared solution to an aqueous mixture of the mineral to be bleached, the mixture having a controlled pH value not greater than 5.5.

17. Method of treating mineral substances, comprising the steps of preparing a solution of a water soluble hydrosulphite, separately preparing an acidified aqueous mixture of the mineral, adding the one to the other, and washing the treated mineral while maintaining the same in acid condition.

FREDERICK W. BINNS.

DISCLAIMER 2,020,132.—*Frederick W. Binns*, Quincy, Mass. METHOD OF BLEACHING MINERAL MATTER. Patent dated November 5, 1935. Disclaimer filed October 8, 1937, by the assignee, *Virginia Smelting Company*.

Hereby enters this disclaimer to the subject matter of claim 4 of said patent in so far as it includes the treatment of mineral matter with sulphur dioxide and zinc metal in an aqueous medium reactively dilute in zinc metal.

[*Official Gazette November 2, 1937.*]